(12) United States Patent
Hsu

(10) Patent No.: US 11,841,578 B2
(45) Date of Patent: Dec. 12, 2023

(54) LED LIGHT BOARD

(71) Applicant: Coretronic Corporation, Hsin-Chu (TW)

(72) Inventor: Chun-Chi Hsu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/976,877

(22) Filed: Oct. 31, 2022

(65) Prior Publication Data

US 2023/0251524 A1 Aug. 10, 2023

(30) Foreign Application Priority Data

Nov. 4, 2021 (CN) .......................... 202111297946.5

(51) Int. Cl.
*G02F 1/133* (2006.01)
*G02F 1/13357* (2006.01)
*G02F 1/1335* (2006.01)

(52) U.S. Cl.
CPC .. *G02F 1/133603* (2013.01); *G02F 1/133607* (2021.01)

(58) Field of Classification Search
CPC ...................... G02F 1/133603; G02F 1/133607
USPC ........................................................ 362/97.1
See application file for complete search history.

(56) References Cited

U.S. PATENT DOCUMENTS

2022/0299823 A1\* 9/2022 Li ..................... G02F 1/133603

FOREIGN PATENT DOCUMENTS

| CN | 110783441 | | 2/2020 | |
|---|---|---|---|---|
| CN | 210666266 | | 6/2020 | |
| CN | 211957638 | | 11/2020 | |
| CN | 114779386 | A \* | 7/2022 | |
| WO | WO-2021190414 | A1 \* | 9/2021 | ....... G02F 1/133603 |

\* cited by examiner

*Primary Examiner* — Christopher M Raabe
(74) *Attorney, Agent, or Firm* — JCIPRNET

(57) ABSTRACT

Provided is a LED light board including a substrate, a plurality of LEDs, and a colloid layer. The substrate has a plurality of adjacent light emission areas. These LEDs are respectively disposed on these light emission areas. The colloid layer is disposed on these light emission areas. These LEDs are disposed between the substrate and the colloid layer, and are covered by the colloid layer. The colloid layer has a plurality of recesses on each light emission area, and these recesses expose an upper surface of the substrate corresponding to these recesses. At least a portion of the recesses on each light emission area are disposed around the corresponding LED.

8 Claims, 2 Drawing Sheets

LED LIGHT BOARD

CROSS-REFERENCE TO RELATED APPLICATION

This application claims the priority benefit of China application serial no. 202111297946.5, filed on Nov. 4, 2021. The entirety of the above-mentioned patent application is hereby incorporated by reference herein and made a part of this specification.

BACKGROUND

Technical Field

The disclosure relates to a light-emitting device, particularly to a LED (light-emitting diode) light board.

Description of Related Art

Regarding to most display devices, the flat display modules are used to display images. Non-self-luminous display media require a backlight module to provide light beams. There are two main types of common backlight module: a side-type backlight module and a direct-type backlight module. A direct-type backlight module is provided with more LEDs, which makes it pricier. In order to reduce the number of LEDs, optical films are adopted to increase the amount of light emitted in the forward direction and to improve the uniformity of light emitted. However, the optical film increases both the thickness and the cost of the backlight module, and there are also alignment tolerances during assembly, both reasons prohibiting the device from exhibiting the effect as expected.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention provides a LED light board that has a good light-emitting effect.

According to an embodiment of the present invention, a LED light board is provided, and the LED light board includes a substrate, a plurality of LEDs, and a colloid layer. The substrate has a plurality of light emission areas disposed adjacently. The LEDs are disposed on the substrate at intervals and are respectively located in the light emission areas. The colloid layer is disposed in the light emission areas of the substrate. The LEDs are covered by the colloid layer and are disposed between the substrate and the colloid layer. The colloid layer has a plurality of recesses in each of the light emission areas, and the recesses expose an upper surface of the substrate. At least a portion of the recesses in each light emission area are disposed around a corresponding LED.

Based on the above, the LED light board provided by the embodiments adopts a colloid layer and a recess structure to guide light. In contrast to the tolerance accumulated because of the stacked optical films in the prior art, the present invention adopts a manufacturing process that minimizes the position deviation of LEDs and recesses to achieve better light output uniformity and/or to reduce the number of the LEDs.

Other objectives, features and advantages of the present invention will be further understood from the further technological features disclosed by the embodiments wherein there are shown and described preferred embodiments of this invention, simply by way of illustration of modes best suited to carry out the invention.

Figure 1A:
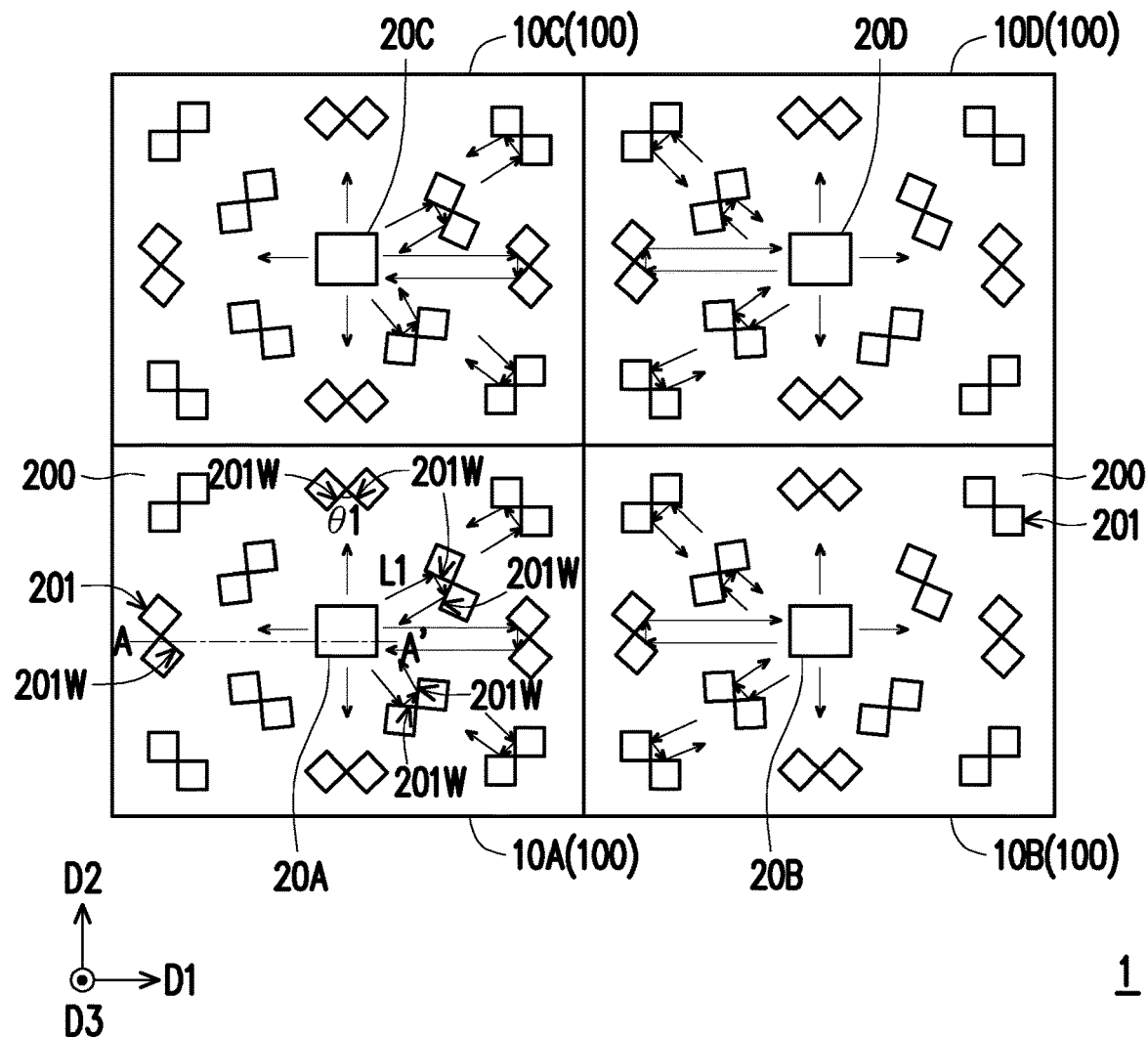
FIG. 1A is a schematic diagram of a LED light board according to an embodiment of the present invention.

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B"

component. Accordingly, the drawings and descriptions will be regarded as illustrative in nature and not as restrictive.

The foregoing and other technical content, features, and effects of the present invention will be clearly presented in the following detailed description of a preferred embodiment with reference to the drawings. The directional terms mentioned in the following embodiments, for example: up, down, left, right, front or back, etc., are only directions for in the attached drawings. Therefore, the directional terms used are used to illustrate but not to limit the present invention.

Figure 1B:
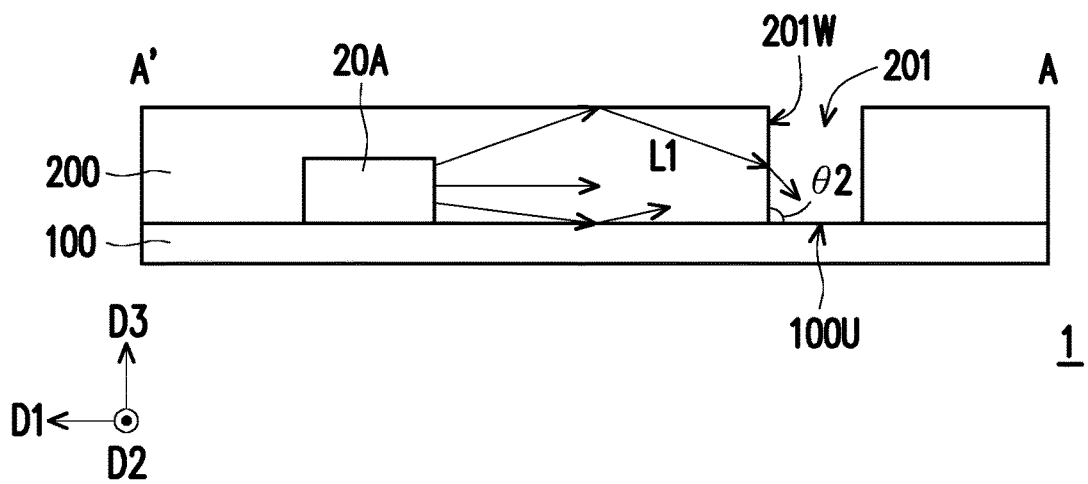
FIG. 1B is a cross-sectional view along the line AA' in FIG. 1A.

In FIG. 1A and FIG. 1B, a LED light board 1 includes a substrate 100, a plurality of LEDs 20A to 20D, and a colloid layer 200. The substrate 100 has a plurality of light emission areas 10A to 10D disposed adjacently. The LEDs 20A to 20D are disposed on the substrate 100 at intervals and are respectively located in the light emission areas 10A to 10D. As shown in FIG. 1, the LEDs 20A to 20D are arranged in array. The colloid layer 200 is disposed in the light emission areas 10A to 10D of the substrate 100. The LEDs 20A to 20D are covered by the colloid layer 200 and are disposed between the substrate 100 and the colloid layer 200. The colloid layer 200 is, for example, a light transmissive glue. The colloid layer 200 disposed in the light emission areas 10A to 10D has a plurality of recesses 201. The recesses 201 are open recesses and expose an upper surface 100U of the substrate 100. At least a portion of the recesses 201 in the light emission area 10A are arranged around the LED 20A, and at least a portion of the recesses 201 in the light emission area 10B are arranged around the LED 20B. At least a portion of the recesses 201 in the light emission area 10C are arranged around the LED 20C, and at least a portion of the recesses 201 in the light emission area 10D are arranged around the LED 20D.

In an embodiment of the invention, the LEDs 20A, 20B, 20C, and 20D are mini LEDs. Since the pins of each mini LED have a small size, after the LEDs 20A, 20B, 20C, and 20D are installed on the substrate 100, the pins may fail due to the impact force received during transportation. In this embodiment, the LEDs 20A, 20B, 20C, and 20D are covered by the colloid layer 200. Therefore, the LEDs 20A, 20B, 20C, and 20D are able to withstand the maximum push-pull force, and the LED light board 1 is prevented from being damaged after receiving impacts force during transportation.

In the embodiment shown in FIG. 1A, the LED light board 1 is illustrated as having four light emission areas 10A to 10D on the substrate 100, and the light emission areas 10A to 10D are disposed on the substrate 100 in a 2×2 array. The LEDs 20A to 20D are respectively disposed in the light emission areas 10A to 10D. The straight line between the LED 20A in the light emission area 10A and the LED 20B in the light emission area 10B is orthogonal to the straight line between the LED 20A in the light emission area 10A and the LED 20C in the light emission area 10C. In other words, the straight line between the LED 20A in the light emission area 10A and the LED 20B in the light emission area 10B is, for example, parallel to a direction D1 in FIG. 1A, whereas the straight line between the LED 20A in the light emission area 10A and the LED 20C in the light emission area 10C is, for example, parallel to a direction D2 in FIG. 1A, and the direction D1 is perpendicular to the direction D2. However, the invention is not limited to this. In other embodiments, the LED light board 1 has M×N light emission areas and M×N corresponding LEDs, that is, one light emission area corresponds to one LED. M and N are positive integers, and M may be equal to or not equal to N. The straight lines between different LEDs may be not orthogonal to each other.

As shown in FIG. 1A, each recess 201 is in a rectangular shape in a plan view (a top view of the LED light board 1), and each recess 201 has at least one light incident side surface 201W. The light incident side surface 201W is defined as the inner side surface of the recess 201 closest to the corresponding LEDs 20A, 20B, 20C, or 20D. Please refer to FIG. 1A together with FIG. 1B. A light beam L1 emitted by the LED 20A transmits in the colloid layer 200 corresponding to the light emission area 10A. The light beam L1 transmitting to the light incident side surface 201W of the recess 201 may change its transmissive direction, because the refractive index of the colloid layer 200 is different from that of air. For example, the light beam transmitted to the light incident side surface 201W may be reflected by the light incident side surface 201W and continues to transmit in the colloid layer 200, or the light beam transmitted to the light incident side surface 201W enters the recess 201 through the light incident side surface 201W and is refracted to transmit away from the recess 201 and the colloid layer 200. The change of the transmissive direction of the light beam L1 depends on the refractive index of the colloid layer 200, the angle between the light incident side surface 201W and the upper surface 100U of the substrate 100, the angle between the light beam L1 and the light incident side surface 201W, the roughness of the light incident side surface 201W, etc. In other words, the light-emitting characteristics of the LED light board 1 can be changed by suitably designing the light incident side surface 201W.

In this embodiment, the LEDs 20A to 20D are covered by the colloid layer 200, and each of the LEDs 20A to 20D is used to generate a lateral light beam as a lateral illuminating LED. In addition, each recess 201 penetrates through two opposite surfaces of the colloid layer 200 in the direction D3, so as to expose the upper surface 100U of the substrate 100 corresponding to the recess 201. In other words, each recess 201 fills with air, and no colloid layer is disposed inside each recess 201. The depth of each recess 201 is at least greater than the height of the corresponding LEDs 20A, 20B, 20C, or 20D. The depth of each recess 201 refers to the distance from the upper surface 100U of the substrate 100 to the upper surface (not labelled) of the colloid layer 200 in the direction D3, and the height of each LED 20A, 20B, 20C, or 20D refers to the distance from the upper surface 100U of the substrate 100 to the upper surface (not labelled) of the LED in the direction D3. In this case, please refer to FIG. 1B, in which the light beam L1 transmitting to the light incident side surface 201W is to be reflected by the light incident side surface 201W or to be refracted when entering the recess 201. The light beam L1 transmitting to the light incident side surface 201W does not pass through the recess 201 and enter the colloid layer 200 on the other side (the right side shown in FIG. 1B). In other words, by arranging the recesses 201 that penetrates through the two opposite surfaces of the colloid layer 200 in the direction D3, the light beams emitted by the LEDs 20A to 20D are blocked and confined within the light emission areas 10A to 10D corresponding to the LEDs 20A to 20D.

Therefore, as shown in FIG. 1A, a plurality of recesses 201 are provided on the line between the LED 20A and the LED 20B, a plurality of recesses 201 are provided on the line between the LED 20A and the LED 20C, and a plurality of recesses 201 are provided on the line between the LED 20A and the LED 20D. Similarly, a plurality of recesses 201 are provided on the line between the LED 20B and the LED 20C, a plurality of recesses 201 are provided on the line between the LED 20B and the LED 20D, and a plurality of recesses 201 are provided on the line between the LED 20C and the LED 20D. According to the characteristic of "light confinement" of the recesses 201, the configuration of the recesses 201 are able to prevent the light beams emitted by the LEDs 20A to 20D from coupling with each other, so as to reduce the phenomenon of halo. In some embodiments of the invention, these recesses 201 are disposed to surround their corresponding LEDs 20A, 20B, 20C, or 20D to sufficiently avoid light coupling between different light emission areas 10A, 10B, 10C, and 10D.

In the embodiment shown in FIG. 1A, the light incident side surfaces 201W of any two adjacent recesses 201 are also configured as such: every two adjacent recesses 201 penetrating through the two opposite surfaces of the colloid layer 200 are disposed in the light emission areas 10A to 10D, so that an angle θ1 is formed between the light incident side surfaces 201W of every two adjacent recesses 201. In some embodiments, the angle θ1 is in a range of 77 degrees to 103 degrees. In some embodiments, the angle θ1 is in a range of 85 degrees to 95 degrees or the angle θ1 is a right angle which is 90 degrees. The transmissive direction of the light beam L1 after being reflected by the light incident side surface 201W is controlled by the above arrangement to increase the length of the transmissive path of the light beam L1 in the colloid layer 200 and improve the brightness uniformity of the LED light board 1. In addition, according to the arrangement of an angle θ1 in a specific range between the light incident side surfaces 201W of every two adjacent recesses 201, the light beam L1 is incident on one of the light incident side surfaces 201W along a transmissive direction and is reflected to the other of the light incident side surfaces 201W. Then the light beam L1 is reflected by the other of the light incident side surfaces 201W and transmits in an opposite transmissive direction, so that the light beams L1 emitted from the LEDs 20A to 20D are confined within the corresponding light emission areas 10A to 10D. In addition, as shown in FIG. 1A, the distances between different recesses 201 and their corresponding LEDs 20A, 20B, 20C, or 20D can be different, so that the LED light board 1 achieves the desired light-emitting characteristics.

In this embodiment, an angle θ2 is included between the light incident side surface 201W and the exposed upper surface 100U of the substrate 100, as shown in FIG. 1B. The amount of light beams outputted from the light incident side surface 201W and entering the recess 201 is able to be controlled by the degree of the angle θ2, so that the LED light board 1 achieves desired light-emitting characteristics. In some embodiments, the angle θ2 is in a range of 90 degrees to 110 degrees. In some embodiments, the angle θ2 is in a range of 95 degrees to 105 degrees. If the angle θ2 between the light incident side surface 201W and the exposed upper surface 100U of the substrate 100 is 90 degrees, it means: the light incident side surface 201W and the exposed upper surface 100U of the substrate 100 are perpendicular to each other, the upper surface 100U of the substrate 100 is parallel to the direction D1 in FIG. 1B, and the light incident side surface 201W is parallel to the direction D3 in FIG. 1B.

In some embodiments taking the LED light board 1 shown in FIG. 1A as an example, the substrate 100 is, for example, a printed circuit board, the LEDs 20A, 20B, 20C, and 20D are, for example, mini LEDs, and the colloid layer 200 is, for example, an ultraviolet curable glue. The LEDs 20A to 20D are fixed on the substrate 100, and successively an ultraviolet curable glue (the colloid layer 200) is coated on the substrate 100 and the LEDs 20A to 20D. According to an image recording a plurality of predetermined positions of the recesses 201, a maskless exposure is performed on the ultraviolet curable glue (the colloid layer 200), and development is performed to remove the glue at the predetermined positions corresponding to the recesses 201. Then, the ultraviolet curable glue (the colloid layer 200) is post-cured for the second time to obtain the LED light board 1 of the present invention.

Other embodiments are described below to fully illustrate different implementation aspects of the present invention. Note here that the following embodiments adopt the element numbers and part of the content of the foregoing embodiments, and the same numbers are used to represent the same or similar elements. Description of the same technical content is omitted. Please refer to the foregoing embodiments for the description of the omitted parts, as the description of the following embodiments is not repeated hereinafter.

Figure 2:
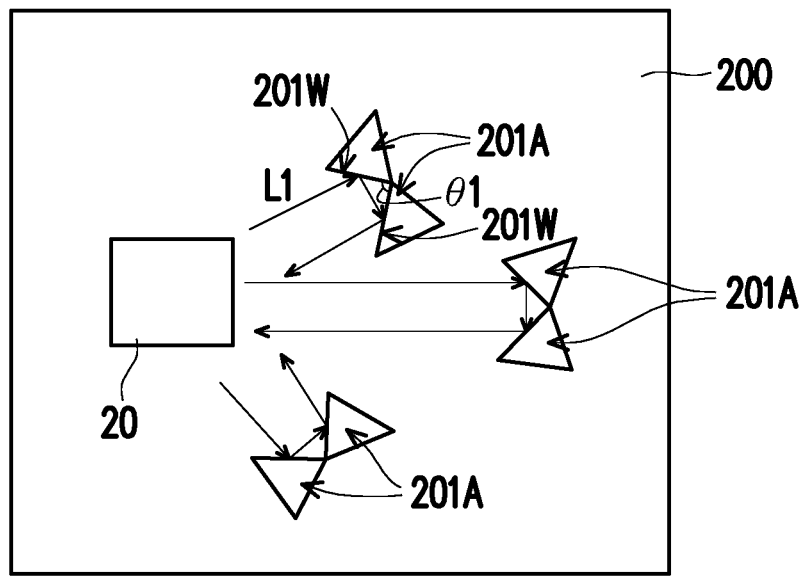
FIG. 2 is a schematic diagram of a LED light board according to an embodiment of the present invention.
Figure 3:
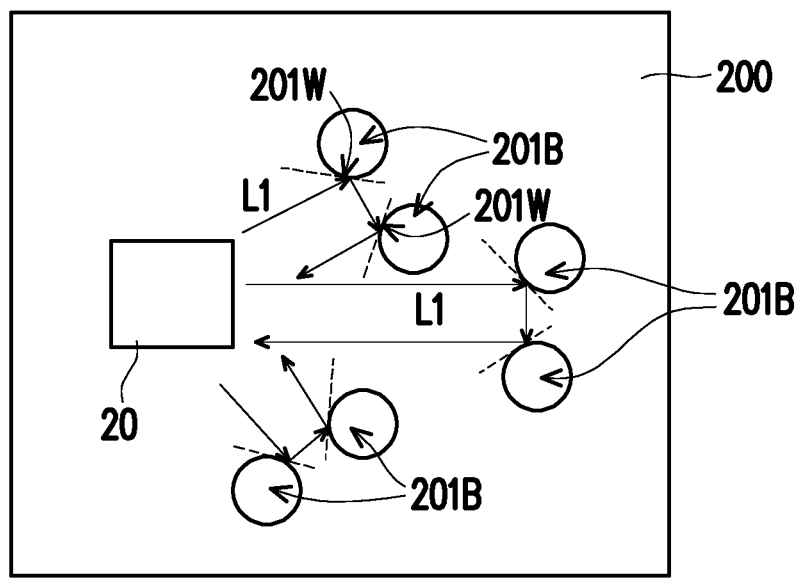
FIG. 3 is a schematic diagram of a LED light board according to an embodiment of the present invention.

FIG. 2 and FIG. 3 illustrate a schematic plan view of a LED light board according to an embodiment of the present invention. Note that FIG. 2 and FIG. 3 only show a partial area of the LED light board for the convenience of explanation.

In FIG. 2, the LED light board 2 includes a substrate (not shown), a LED 20, and a colloid layer 200. The colloid layer 200 covers the LED 20 and has a plurality of recesses 201A. Similar to the embodiment shown in FIG. 1A and FIG. 1B, an angle θ1 is included between the light incident side surfaces 201W of every two adjacent recesses 201A. The differences between this embodiment shown in FIG. 2 and the embodiment shown in FIG. 1A and FIG. 1B are that each recess 201A is in triangular shape in the plan view (the top view of the LED light board 2), and that the light incident side surface 201W corresponds to one of the sides of the triangle, that is, the light incident side surface 201W corresponds to one of the inner side surfaces of each triangular recess.

In FIG. 3, the LED light board 3 includes a substrate (not shown), a LED 20, and a colloid layer 200. The colloid layer 200 covers the LED 20 and has a plurality of recesses 201B. This embodiment is different from the embodiment shown in FIG. 1A and FIG. 1B in that the recess 201B is in a circular shape in a plan view (the top view of the LED light board 3), and that the light incident side surface 201W corresponds to part of the circumference of the circular recess 201B. An angle θ1 is included between the tangents of the light incident side surfaces 201W of every two adjacent recesses 201B. The recess in the embodiments of the invention is not limited to be in the shape of rectangle, triangle, and circle in the above embodiment. In other embodiments, the recesses are other polygons.

In summary, the LED light board provided by the embodiments of the invention covers the LEDs with a colloid layer, which improves the maximum push-pull force that the LED can withstand. Besides, the LED light board adopts a colloid layer and a recess structure to guide light. In contrast to the tolerance accumulated by optical films in the prior art, the present invention adopts a manufacturing process that minimizes the position deviation of LEDs and recesses to achieve better light output uniformity and/or to reduce the number of the LEDs and the optical films to lower the cost.

However, the above are only preferred embodiments, and should not be used to limit the scope of implementation of the present invention, that is, simple equivalent changes and modifications made in accordance with the scope of the patent application of the present invention and the description of the invention, all are still within the scope of the invention patent. In addition, any embodiment of the present invention or the scope of the patent application does not have to achieve all the objectives or advantages or features disclosed in the present invention. In addition, the abstract part and title are only used to assist in searching for patent documents, and are not used to limit the scope of rights of the present invention. Furthermore, the first, second, etc. mentioned in the specification are only used to indicate the names of the components, and are not used to limit the upper or lower limit of the number of components.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A LED light board, comprising: a substrate, a plurality of LEDs and a colloid layer, wherein the substrate has a plurality of light emission areas disposed adjacently, the LEDs are disposed on the substrate at intervals and are respectively located in the light emission areas, and the colloid layer is disposed in the light emission areas of the substrate, the LEDs are covered by the colloid layer and are disposed between the substrate and the colloid layer, the colloid layer has a plurality of recesses in each of the light emission areas, the recesses expose an upper surface of the substrate, and at least a portion of the recesses in each of the light emission areas are disposed around the corresponding LED, wherein each of the recesses has a light incident side surface closest to the corresponding LED, in a cross-section parallel to the substrate, an angle included between the light incident side surfaces of every adjacent two of the recesses is in a range of 77 degrees to 103 degrees.

2. The LED light board according to claim 1, wherein an angle included between the light incident side surface and the exposed upper surface of the substrate is in a range of 90 degrees to 110 degrees.

3. The LED light board according to claim 1, wherein distances between the recesses and the corresponding LEDs are different.

4. The LED light board according to claim 1, wherein a depth of each of the recesses is at least greater than a height of the corresponding LED.

5. The LED light board according to claim 1, wherein at least one of the recesses is arranged on a line between every adjacent two of the LEDs.

6. The LED light board according to claim 1, wherein each of the LEDs is a lateral illuminating LED.

7. The LED light board according to claim 1, wherein a shape of orthogonal projections of the recesses on the substrate is at least one of a circle, a triangle, a rectangle, or a polygon.

8. The LED light board according to claim 1, wherein the LEDs are mini LEDs.

\* \* \* \* \*